United States Patent [19]

Pike

[11] 4,319,907
[45] Mar. 16, 1982

[54] METHOD FOR BENDING AND TEMPERING AN APERTURED GLASS SHEET

[75] Inventor: Robert F. Pike, Altoona, Pa.

[73] Assignee: PPG Industries, Inc., Pittsburgh, Pa.

[21] Appl. No.: 186,988

[22] Filed: Sep. 15, 1980

[51] Int. Cl.³ .............................................. C03B 23/03
[52] U.S. Cl. ...................................... 65/106; 65/104; 65/105
[58] Field of Search ................. 65/106, 105, 273, 287, 65/288, 103, 104

[56] References Cited

U.S. PATENT DOCUMENTS

| | | | |
|---|---|---|---|
| 3,279,906 | 10/1966 | Baker | 65/268 |
| 3,367,764 | 2/1968 | Seymour | 65/291 |
| 3,469,963 | 9/1969 | Beattie | 65/288 |
| 3,819,351 | 6/1974 | Shaffer et al. | 65/273 |
| 3,960,535 | 6/1976 | Hamilton et al. | 65/104 |
| 4,124,367 | 11/1978 | Reese et al. | 65/105 X |

Primary Examiner—Arthur D. Kellogg
Attorney, Agent, or Firm—Donald Carl Lepiane; Edward I. Mates

[57] ABSTRACT

In a mold for shaping an apertured glass sheet comprising a shaping plate having a heat capacity more than that of the glass sheet per unit area and a shaping surface complementary to that desired for the glass sheet, areas having less heat capacity per unit area than that of the shaping plate are preferably obtained by cutting apertures in the shaping plate. These apertures or low heat capacity areas are located in the shaping plate in position to face corresponding apertures of the glass sheet to be shaped. When the shaping is performed by press bending the sheet between a pair of molds, preferably both press bending molds of press bending apparatus are apertured. The apertures or areas of low heat capacity in the molds are preferably slightly larger than the apertures in the glass sheet undergoing shaping to improve the stress pattern around the peripheral portion of the glass sheet apertures.

4 Claims, 3 Drawing Figures

METHOD FOR BENDING AND TEMPERING AN APERTURED GLASS SHEET

BACKGROUND OF THE INVENTION

1. Field of the Invention

The present invention relates to shaping and tempering apertured glass sheets and, while it may be incorporated in a single glass sheet shaping mold, is particularly suitable to a method and apparatus that incorporates shaping glass sheets by a press bending operation that is capable of producing apertured bent glass sheets on a mass-production basis within precise toleances. Though the present invention originated to solve problems existing in the shaping and tempering of glass sheets, particularly sheets having a thickness of 4 mm or less, it is understood that the principles of the present invention may be employed for shaping apertured sheet material composed of heat-softenable compositions other than glass.

Glass sheets or plates have been bent by supporting the sheet to be bent between a pair of glass shaping molds while at a temperature sufficiently high to be deformable by pressurized contact between the pair of glass shaping molds having major, complementary shaping surfaces conforming to the shape desired for the bent glass. In the past, the glass shaping molds comprised either solid metal or refractory members or outline metal members covered with suitable material to insulate the glass from direct contact with the metal so as to avoid chill cracking.

Apertured glass sheets shaped by press bending using solid molds tended to develop flaws at the periphery of the apertures. Such flaws led to production losses.

If the apertured glass, while shaped by press bending molds, is contacted around its marginal portion only, only the shape of the marginal edge is controllable within tolerance. The shape of the interior portion is not controlled.

It would be beneficial for the glass sheet bending art to develop a method of conforming apertured glass sheets to their desired shape throughout their entire extent without introducing flaws in the vicinity of the glass sheet apertures that result in a high frequency of production losses during a bending and tempering operation, during which the apertured glass sheets are subjected to high temporary stresses.

2. Description of Patents of Interest

U.S. Pat. No. 3,367,764 to Seymour provides glass shaping apparatus of the press bending type that engages the opposite surfaces of the glass substantially equally during the shaping operation, that is easily adjustable to change its shape in the event glass is bent slightly out of tolerance without requiring dismantling of the entire apparatus, and that is capable of simple adjustment to produce several different configurations that are not too dissimilar from one another.

The Seymour patent provides apparatus for bending a heat-softened glass sheet by sandwiching a glass sheet in pressurized engagement between glass facing surfaces of a pair of glass shaping molds having major, complementary shaping surfaces conforming substantially to the shape desired for the bent glass sheet and relatively movable between a retracted position and a glass engaging position.

A glass shaping mold of the Seymour patent comprises a relatively flexible shaping plate of metal having a pressing face whose shape approximates that of the shape desired for the glass sheet after bending. The relatively flexible shaping plate extends substantially continuously throughout substantially its entire extent and has sufficient rigidity to resist deformation during pressurized engagement against a heat-softened glass sheet.

The apparatus also comprises a relatively rigid member in the form of a metal plate having an area at least substantially coextensive with that of the relatively flexible metal plate located in spaced relation behind said relatively flexible metal plate. Attachment means is distributed throughout the extent of the relatively flexible metal plate and the relatively rigid metal plate for connecting the plates in spaced relation to one another, for insuring positive alignment of the central portion of the shaping plate to the corresponding portion of the rigid plate while permitting the shaping plate to expand thermally without distorting from its desired local configuration, and for making slight alterations in the shape of the relatively flexible metal plate without altering the configuration of the relatively rigid metal plate. The space between the shaping plate and the rigid plate permits access to adjust the attachment means. Such adjustment changes the local contour of the shaping plate by altering the distance between the shaping plate and the rigid plate in the vicinity of the attachment means.

While the apparatus patented by Seymour is suitable for shaping glass sheets to different shapes, the adjustment members are arranged in a checkerboard pattern with each adjustment member spaced from another adjustment member by about 4 inches in order to permit access for an adjustment tool. When press bending apparatus is used to shape apertured glass sheets having one or more apertures located in a region of sharp bending, the adjustment members are usually not located in positions where critical adjustments may be made about the periphery of the critical apertures, which are most likely to be shaped out of tolerance limits. These apertures are needed in movable windows, such as side windows in automobile doors and the like, to receive actuating mechanisms that help open and close the windows.

U.S. Pat. No. 3,819,351 to Shaffer and Plank solves a need for providing means to adjust the critical portions of the shaping face of a press bending mold, namely, the portions that apply pressurized engagement against the peripheral portion of apertures in apertured glass sheets to be shaped by press bending. This patent provides means for locally adjusting the shaping face of a press bending mold in the vicinity of the periphery of any given aperture by providing a localized shape adjustment member in the vicinity of each aperture.

In a specific embodiment of the Shaffer and Plank patented apparatus, an aperture is provided in the relatively flexible metal plate in each region facing an aperture drilled through the glass sheet to be shaped by press bending, a metal plug having the same heat capacity per unit area as that of the metal plate and an area substantially coextensive with that of the aperture is supported within said aperture by a plug attachment member adjustably secured to the rigid member to which the attachment means of the Seymour patent adjustably secure the relatively flexible metal plate.

Each plug has its shaping surface conforming exactly to the shape desired for the bent glass sheet surrounding the given aperture. When the position of the plug attachment is properly adjusted, the plug attached thereto provides more precise control of the shape imparted to the glass sheet in the vicinity of a given aperture than is possible with the adjustment means provided by the apparatus of the aforesaid Seymour patent. Unfortunately, the plugged Shaffer and Plank patented apparatus produced press bent apertured glass sheets at yields below those experienced in press bending non-apertured glass sheets. These lesser yields were believed to be associated with fissures around the apertures of the apertured glass sheets.

U.S. Pat. No. 3,960,535 to Hamilton and Oelke reduces production losses in bending apertured glass sheets that are shaped while supported on an outline mold by using the outline mold to lift individual glass sheets into engagement against an upper mold of complementary shape. Each apertured portion of the glass sheet is provided with supplemental heat while supported on the outline mold to improve the temper of the resulting glass sheet and also to improve the survival rate of the shaped sheets processed through a cooling area of tempering apparatus immediately after shaping. The use of a horizontally disposed outline mold to support the hot glass sheet for shaping results in loss of control of sag in the intermediate portion of the glass sheet. Yet, an outline mold is needed to allow gas burners to radiate supplemental heat locally toward the vicinity of the apertured portions of the glass sheet being shaped. Furthermore, the inclusion of gas burners complicates the bending mold structure and introduces an additional complicating factor of coordinating the activity of the local gas burners with the operation of the shaping apparatus. The glass sheet bending art found it desirable to obtain a more simple apparatus to shape apertured glass sheets more closely to their desired shapes while providing an improved survival rate during the tempering process and less frequent breakage during processing after fabrication and during ultimate use of the fabricated product when installed.

SUMMARY OF THE PRESENT INVENTION

The present invention has reduced the frequency of production losses due to weakness of the bent and tempered glass sheets in the vicinity of the apertures. This weakness is especially evident in glass sheets whose thickness does not exceed 4 mm.

Reduction in breakage (both during production and use) has been accomplished by replacing the plugs from the Shaffer and Plank patented apparatus with areas having lesser heat capacity per unit area, preferably in the form of apertures, in the shaping plate of at least one of press bending molds, and, more preferably, of both press bending molds that are aligned with and slightly larger than the corresponding glass sheet aperture. The absence of high heat capacity metal from the metal shaping plates of the press bending molds in the vicinity of the glass sheet apertures is believed to reduce heat transfer between the relatively cold mold and the relatively hot glass sheet in the vicinity of the glass sheet aperture during the press bending operation. Consequently, the peripheral portion of each glass sheet aperture is at a slightly higher temperature than the remainder of the apertured glass sheet when the press bent glass sheet enters a cooling area where blasts of cold tempering medium are applied toward the surfaces of the press bent glass sheet at a rate sufficient to impart the desired degree of temper. Under such circumstances, the peripheral portions of the glass sheet apertures are less likely to develop temporary tensile stresses that cause breakage to develop from fissures that result from drilling the apertures than when the apertured glass sheet portions are engaged with greater heat capacity portions of the shaping plates of the Seymour apparatus or the high heat capacity plugs of the Shaffer and Plank apparatus.

In addition, after the press bent apertured glass sheet is tempered, using the press bending apparatus of the present invention for shaping the glass, the resulting compression stresses in the peripheral portion of the apertures are higher than those that result from tempering glass sheets that are press bent by the Seymour or Shaffer and Plank press bending apparatus. Consequently, the resulting press bent and tempered apertured glass sheets processed on apparatus conforming to the present invention are less likely to fracture in the vicinity of their apertures during use than corresponding parts that are press bent and tempered using prior art press bending apparatus.

It is evident that the present invention provides relatively simple glass sheet shaping apparatus that need not be encumbered by superfluous structural elements, such as gas burners, to obtain the benefits of this invention. It is also evident that apparatus conforming to this invention requires less attention during operation than prior art apparatus, such as evidenced by the aforementioned Hamilton and Oelke patent, to coordinate the movement of the molds and the localized heat radiated by the gas burners.

In order to understand fully the present invention, a description of a particular embodiment and variations thereof will now be described.

BRIEF DESCRIPTION OF THE DRAWINGS

In the drawings which form part of the description of this illustrative embodiment and wherein like reference numerals refer to like structural elements.

DESCRIPTION OF A PREFERRED EMBODIMENT

Figure 1:
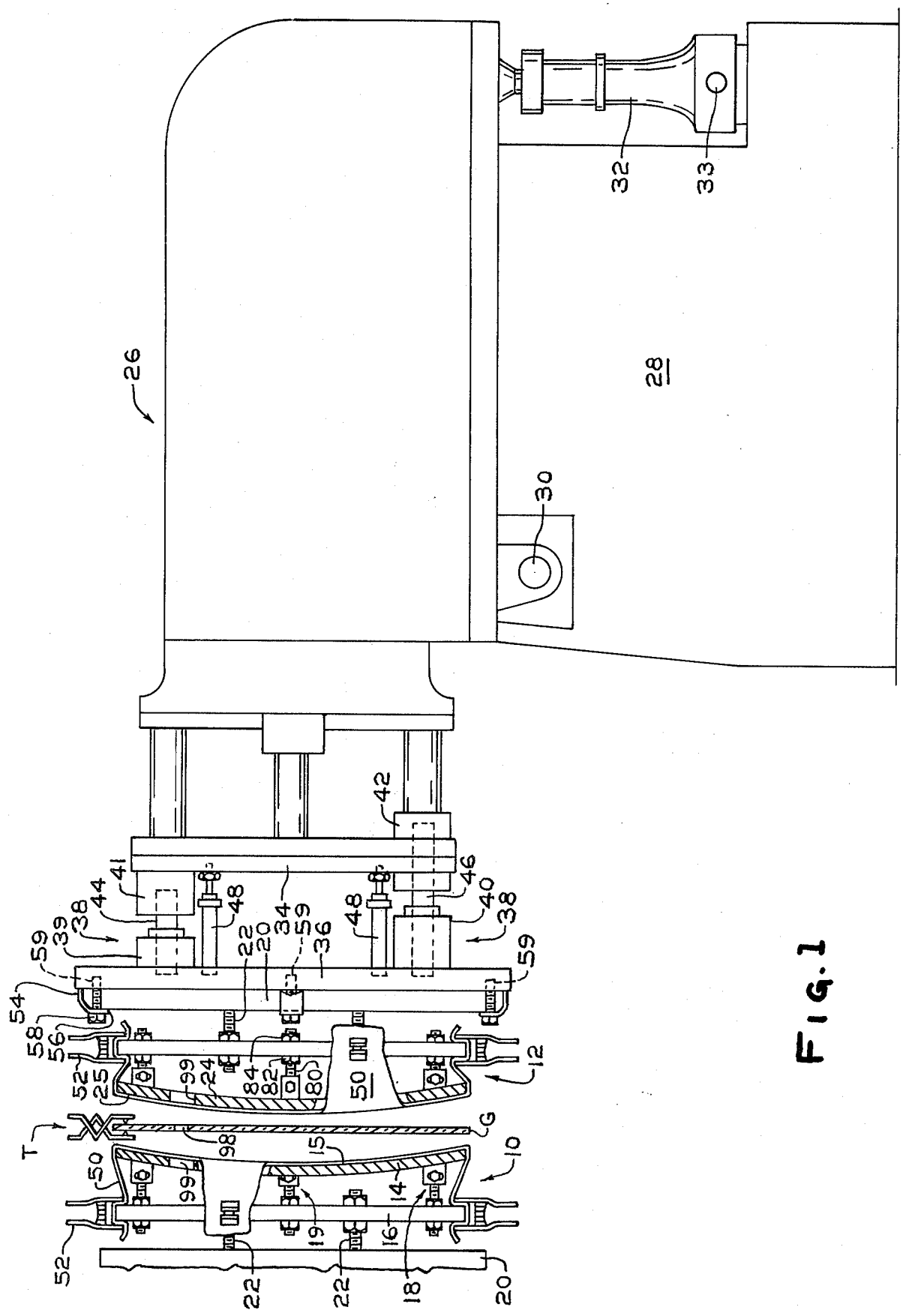
FIG. 1 is a fragmentary end elevation of an embodiment of the present invention with its cover member partially removed showing how a glass shaping mold is attached to actuating mechanism.
Figure 2:
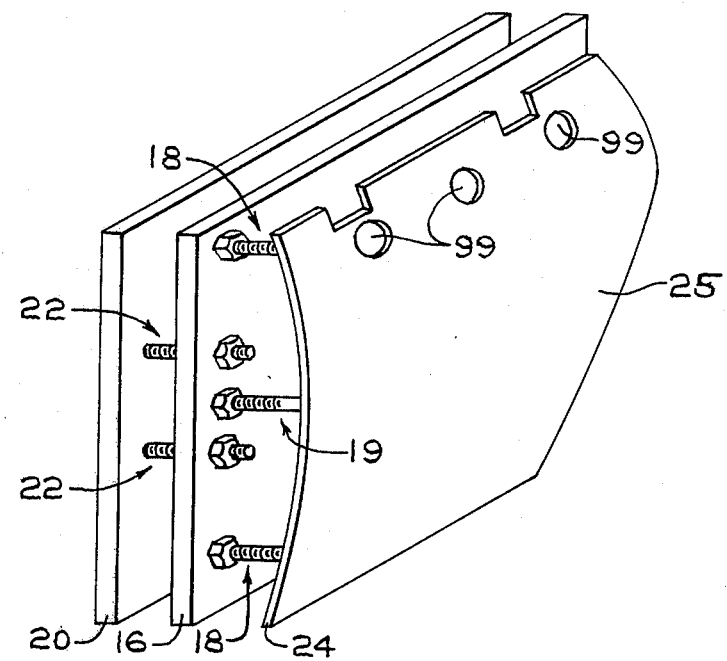
FIG. 2 is a perspective schematic, fragmentary view of one of the molds of FIG. 1 showing one glass shaping mold with its cover completely removed to disclose further elements of the construction.

A glass shaping apparatus illustrating the present invention comprises a concave shaping mold 10 and a convex shaping mold 12. As seen in FIG. 1, the concave shaping mold 10 comprises a relatively flexible shaping plate 14, having a concave shaping surface 15 facing forward in one direction. A relatively rigid member in the form of a metal plate 16 is disposed in spaced relation behind the shaping plate 14 by means of a series of attachment means 18 distributed throughout the extent of the plates and additional centrally disposed attachment means 19 to connect one plate to another in a manner described in detail in said U.S. Pat. No. 3,367,764 to Seymour. A rigid back plate 20 is connected in spaced relation to the rigid metal plate 16 by a plurality of rigid, elongated, adjustable connectors 22.

The convex shaping mold 12 comprises a relatively flexible shaping plate 24 having a shaping surface 25 complementary to that of the concave shaping mold 10. A relatively rigid member in the form of another metal plate 16, attachment means 18 and 19 connecting the relatively rigid metal plate 16 to the rear of and in spaced relation to shaping plate 24, a rigid back plate 20 and connecting means 22 connecting the rigid back plate to the relatively rigid metal plate 16 are associated with the convex shaping mold 12 in a manner similar to how the like elements are associated with the concave shaping mold 10.

A piston assembly 26 shown in FIG. 1 attached to the rear of convex shaping mold 12 is provided for each of the shaping molds 10 and 12. Each piston assembly 26 is supported on a piston support structure 28. The shaping mold 10 or 12 and its attached piston assembly 26 is pivotally mounted about a pivot 30. A vertically adjustable piston 32 whose housing is pivotally mounted to the piston support 28 at pivot 33 supports the rear end of piston assembly 26. Vertical adjustment of piston 32 permits the entire shaping mold and its actuating piston assembly 26 to pivot with respect to the axis of pivot 30, to orient the shaping molds in a manner well known in the art. This enables the shaping surface of each mold to be oriented at any angle desired with respect to the vertical plane in which a glass sheet G is suspended from tongs T for the shaping operation. The glass sheet has at least one aperture 98 through its thickness.

The front end of the piston assembly 26 is attached to a piston actuated plate 34. The latter is aligned with a piston plate 36 through a plurality of alignment couplings 38. The alignment couplings 38 between plates 34 and 36 comprise guide blocks 39 and 40 attached to the rear of plate 36 and guide blocks 41 and 42 aligned axially with guide blocks 39 and 40, respectively, and attached to plate 34. Rods 44 extend loosely between aligned guide blocks 39 and 41, while rods 46 extend loosely between aligned guide blocks 40 and 42. A spring loaded coupling 48 is connected between the piston actuated plate 34 and the piston plate 36 in the vicinity of each alignment coupling 38.

Each shaping mold is provided with a cover 50 in direct contact with the shaping surface 15 or 25. The cover 50 is preferably of a flexible, heat-insulating, low heat capacity material that does not harm glass at elevated temperatures. Preferably, the material for the cover is a stretchable fiber glass cloth composed of texturized yarns. U.S. Pat. No. 3,148,968 to Cypher and Valchar discloses superior mold covers of this type.

A number of closely spaced clamps 52 are mounted around the periphery of the relatively rigid metal plate 16. These clamps secure the cover 50 in position where it is in unwrinkled condition against the shaping surface 15 or 25 which it covers.

While the present apparatus is susceptible of making slight modifications in the shaping surfaces by changing the contour of the relatively flexible shaping plates 14 and 24, it is also desirable to provide means for rapidly changing from one glass shaping member to another when the pattern to be manufactured differs radically from one previously manufactured. This rapid change is accomplished by utilizing a series of brackets 54 having an L-shape in cross section and provided with a flange 56 extending over the marginal portion of the front surface of each rigid back plate 20. Flange 56 is apertured to receive a bolt 58 threaded into a threaded recess 59 contained in plate 36. Thus, the rigid back plate 20 of each shaping mold 10 or 12 may be quickly clamped to the piston plate 36 and replaced with another shaping mold having the desired configuration when a radical change in pattern is called for. The above construction is far easier to replace than heavy massive solid shaping molds used previously.

Figure 3:
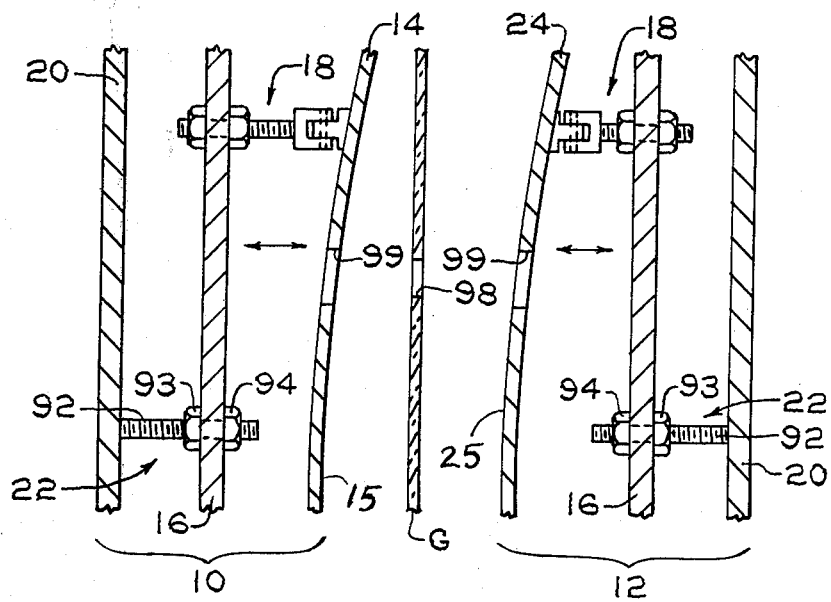
FIG. 3 is an exploded fragmentary sectional view of a pair of shaping molds, one having a convex pressing face, the other having a concave pressing face, with the covers removed to show how the elements are attached to one another to provide the results of the present invention.

The connecting means 22 connecting the relatively rigid metal plate 16 in spaced relation to the rigid back plate 20 comprises a series of threaded rods 92 (FIG. 3) attached at their rear end to plate 20 and with their forward end extending through apertures in plate 16. A pair of lock nuts 93 and 94 (FIG. 3) and washers rigidly secure the front end of each threaded rod 92 to the front and rear surface of plate 16, respectively, to secure plates 16 and 20 in adjustably spaced relation to one another.

The purpose of spacing the rigid plates 16 from the shaping plates 14 or 24 is to provide access for tools to adjust the length of the adjustment means 18 and 19. The latter interconnect different portions of the plate 16 which is relatively rigid and the relatively deformable shaping plate 24 or 14. By adjusting the location of lock nuts 82 and 84 along an externally threaded shaft 80, stresses are established in the relatively flexible metal shaping plate 14 or 24 to adjust their respective shaping faces 15 or 25 locally to the shape desired for the glass to be bent without changing the contour of the relatively rigid plate.

While the terms "relatively flexible" and "relatively rigid" have been used to describe the metal plates forming part of the present apparatus, it is understood that the rigidity and the flexibility of the metal plates are with respect to one another and that the relatively flexible metal plates are substantially rigid compared with the rigidity of a heat-softened glass sheet which undergoes shaping by sandwiching the sheet between a pair of shaping molds in pressurized contact. The rigidity of the shaping plates 14 and 24 is enhanced by the rigidity of the attachment means 18 and 19 along its axis extending between the shaping plate and the rigid plate 16.

In a typical apparatus for bending glass sheets up to thicknesses of ¼ inch (6.35 mm), the relatively flexible plates 14 and 24 were constructed of ¼ inch (6.35 mm) thick hot rolled steel plates that had been shaped previously to a 60 inches (1.5 meters) radius bend about one axis and a 1440 inches (36 meters) radius bend about the other axis. The relatively rigid metal plates 16 were slightly larger in area than the shaping face of the relatively flexible shaping plate 14 and were formed of ½ inch (1.27 centimeters) thick cold rolled 1018 carbon steel. The latter imparted stiffness and rigidity to the entire assembly.

Further rigidity for the relatively flexible shaping plates was provided by the reinforcement provided through the attachment means 18 and 19 which interconnected the relatively flexible metal plate 14 or 24 and the relatively rigid metal plate 16. Thus, the relatively flexible metal plates 14 and 24 which provide the pressing faces 15 and 25, respectively, whose shape approximates that of the shape desired for glass sheet after bending, had sufficient rigidity to resist deformation during pressurized engagement against the opposite surfaces of heat-softened glass sheets.

The attachment means permit the shaping plates or face plates 14 and 24 to be fabricated to the approximate curve desired. These approximate shapes are then adjustable by locating the attachment means at strategically located positions behind the curved shaping plates or face plates 14 and 24 to make the latter sufficiently rigid to withstand without deformation the pressure strains arising during continuous production of bent glass sheets. This plate rigidity with freedom of movement responsive to heat stresses is obtained through engineering design of the assembly of the attachment means and by the number, location, and spacing of the attachment means 18. Each curved configuration must be analyzed as to the best location, spacing, and orientation of the individual attachment means to provide satisfactory production.

The apparatus described previously conforms to that of U.S. Pat. No. 3,367,764 of Samuel L. Seymour. The present invention provides the Seymour apparatus with means to insure an improved stress pattern around the peripheral portion of any aperture of glass sheets to be shaped by press bending.

According to a preferred embodiment of the invention, an area portion having less heat capacity per unit area than the shaping plate, preferably an aperture 99 of approximately circular configuration, is provided for each relatively flexible metal plate 14 or 24 in each area that faces a corresponding aperture 98 in a glass sheet to be shaped by press bending when said glass sheet is properly aligned between press bending molds 10 and 12. Each aperture 99 is slightly larger in diameter than the glass sheet aperture 98 that it faces.

A typical construction of a preferred embodiment of the present invention to press bend a glass sheet having a thickness of 5/32 inch (4 mm) and apertures having a diameter of 11/16 inch (17.5 mm) involved cutting out a circle from the relatively flexible shaping plate 24 of the pressing mold 12 with a convex shaping surface in alignment with the center of each aperture in the glass sheet undergoing processing. An aligned circle was cut from the shaping plate 14 of the pressing mold 10 with a concave shaping surface. The cut circles had diameters of about 1 inch (25.4 mm).

EXAMPLE I

In a first experiment to determine the utility of the present invention, a pair of press bending molds constructed according to the Seymour patent was modified by cutting aligned apertures in both shaping plates to face one of the three apertures in glass sheets to be press bent and tempered, an aperture was cut in only one of the shaping plates to face the second glass sheet aperture and both shaping plates were not modified by drilling no aperture in the region sandwiching the third glass sheet aperture. The region in the vicinity of the first glass sheet aperture was treated in a manner simulating the best mode of the present invention wherein an apertured portion of the glass sheet is engaged between stretched portions of fiber glass mold covers over aligned apertures of slightly larger area of a pair of shaping plates. The region in the vicinity of the second glass sheet aperture was treated in a manner simulating an alternate embodiment of the present invention wherein an apertured portion of the glass sheet is engaged between fiber glass mold covers, one of which bridges an aperture slightly larger than and aligned with the glass sheet aperture and the other of which covers a solid portion of the flexible shaping plate of the other press bending mold. The region in the vicinity of the third glass sheet aperture was treated in a manner simulating the treatment obtained using an unmodified press bending mold of the Seymour patent wherein the third glass sheet aperture is engaged between fiber glass mold covers, both of which are directly over solid portions of the flexible shaping plates of the press bending molds. It is believed that the results obtained from treating the region in the vicinity of the third glass sheet aperture would not differ significantly from those obtained using a mold of the type depicted in the Shaffer and Plank patent wherein the portions of the fiber glass covers that engage the third glass sheet aperture cover plugs of equal heat capacity per unit area inserted in apertured portions removed from the flexible shaping plates.

Specifically, glass sheets provided with three apertures were heated, press bent with the press bending mold of the Seymour patent modified as described previously for this experiment, and quenched with tempering medium under regular production conditions. Two of the glass sheets were removed from the production line after being press bent and tempered.

The press bent and tempered, apertured glass sheets were measured for compression stress using a quartz wedge at diametrically opposite sides of each aperture. The quartz wedge measured optical displacement through the glass sheet thickness. The displacement was converted into compression stress in psi units by the formula $$\text{Stress (p.s.i.)} = \frac{\text{Optical Displacement (mu)}}{\text{Glass Thickness (inches)}} \times 2.11$$

The results of the first experiment was reported in Table I.

TABLE I

COMPRESSION STRESS AROUND APERTURE OF APERTURED TEMPERED GLASS SHEETS PRESS BENT UNDER DIFFERENT CONDITIONS IN VICINITY OF APERTURE

| Shaping Plate Condition | Compression Stress (psi) | |
|---|---|---|
| | Sheet 1 | Sheet 2 |
| (A) Both solid | 10,350<br>9,530 } 9,940 Average | 11,430<br>10,890 } 11,160 Average |
| (B) One solid;<br>one apertured | 11,570<br>11,780 } 11,680 Average | 12,520<br>11,840 } 12,180 Average |
| (C) Both apertured | 12,800<br>12,520 } 12,660 Average | 13,890<br>13,200 } 13,550 Average |
| Improvement B over A | 17.5 percent | 9.1 percent |
| Improvement C over A | 27.4 percent | 21.4 percent |

EXAMPLE II

A second experiment was performed on a production pattern having seven apertures, each having a diameter of ½ inch (12.7 mm). A press bending apparatus comprising a pair of press bending molds conforming to the Seymour patent was used for initial production. The press bending molds were converted to conform to the present invention by drilling seven apertures in the shaping plates of each of the molds with the center of each of said apertures coinciding with the center of the glass sheet aperture. Six of the plate apertures had a diameter of 1½ inches (38.1 mm). The seventh plate aperture of each mold (which was aligned with the seventh plate aperture of the other mold) had a diameter of 1 inch (25.4 mm) and is designated as a special hole.

A specimen of the press bent, tempered glass sheets conforming to this pattern made on the apparatus before the modification and another specimen made on the modified apparatus were measured for compression stress at diametrically opposite portions of the apertures in the same manner as described in Example I. The results are summarized in Table II that follows:

TABLE II

COMPARISON OF COMPRESSION STRESS READINGS AT GLASS SHEET APERTURE BEFORE AND AFTER PRESS BENDING MOLD MODIFICATION

| WHEN SPECI-MEN MADE | Compression Stress Range (PSI) and (Average Stress) | |
|---|---|---|
| | (OF ALL APERTURES) | (AT SPECIAL HOLE) |
| Before mold modification | 9,130–12,540 (11,230) | 9,900–10,780 (10,340) |
| After mold modification | 12,540–15,950 (14,030) | 12,980–13,860 (13,420) |
| Improvement in average stress | 24.9 percent | 29.8 percent |

It is obvious from the results of the experiments performed that removing a solid member or solid portion of the shaping plate in the vicinity of the shaping plate portion that engages each apertured glass sheet portion during the press bending step of a press bending and tempering operation develops a stronger aperture in the resulting apertured, shaped and tempered glass sheets. It is also believed that replacing said solid portion of the shaping plate with an area portion of any material having less heat capacity than the removed portion will improve the strength of the treated glass sheet around each glass sheet aperture.

As an alternative to the embodiments described previously, the area portions of less heat capacity per unit area may be filled with filler material other than air that occupies the mold apertures. The filler material used must have a much lower heat capacity per unit area than the shaping plate and may be composed of materials such as fiber glass, an alumina-silica cement, a fiber glass reinforced epoxy resin composition and other like materials that can withstand the temperature at the shaping station, do not react with the metal shaping plate or the fiber glass cover, and do not withdraw as much heat from the glass sheet portion it engages as the solid portion of the metal shaping plate of the mold it replaces.

A typical preferred embodiment and variations of the present invention have been described for purposes of illustration. It is understood that various changes may be made from the illustrative preferred embodiment without departing from the spirit of the invention as defined in the claimed subject matter which follows. Some of these modifications may include providing apertures in only one of the press bending molds instead of in both molds, using one apertured mold in combination with an outline mold or using a single apertured mold as a shaping apparatus, using only one piston to actuate one shaping mold only instead of actuating both shaping molds, orienting the shaping members to shape heat-softened glass sheets supported in horizontal or oblique planes of support as well as in the vertical plane disclosed, shaping glass sheets supported by their bottom edge or by gaseous support in either horizontal or vertical or oblique orientations, heat strengthening press bent glass sheets and cooling them to develop only a partial temper, and any other well-known modifications of glass shaping and tempering apparatus wherein the present invention is susceptible of use.

I claim:

1. In a method of bending and tempering a glass sheet having at least one aperture wherein the method includes the steps of heating the glass sheet to a temperature sufficient for subsequent bending and tempering; positioning the heated sheet on shaping surface of shaping means; bending the sheet by way of the shaping means; and cooling the bent sheet to impart at least a partial temper thereto, the improvement comprising the steps of:
   providing the shaping surface of the shaping means with an aperture consisting of a hole; and
   the positioning step includes the step of aligning the at least one aperture in the sheet and the aperture in the shaping surface.

2. The method as set forth in claim 1 wherein the shaping means includes opposed shaping molds having shaping surfaces of complementary shape for engaging opposite major surfaces of the glass sheet and one of the shaping surfaces is the shaping surface with the aperture consisting of a hole.

3. The method as set forth in claim 2 wherein the other shaping surface has an aperture consisting of a hole with the aperture in the shaping surfaces of the opposed shaping molds aligned with one another during the practice of the bending step.

4. The method as set forth in claim 2 or 3 further including the step of:
   interposing a layer of flexible, heat insulating, low heat capacity material between shaping molds and the glass sheet prior to practicing the bending step.

* * * * *